US010023088B2

(12) United States Patent
Anderson et al.

(10) Patent No.: US 10,023,088 B2
(45) Date of Patent: Jul. 17, 2018

(54) VEHICLE INTERIOR COMPONENT

(71) Applicant: Shanghai Yanfeng Jinqiao Automotive Trim Systems Co., Ltd., Plymouth, MI (US)

(72) Inventors: Rick Alan Anderson, Grand Haven, MI (US); Randy William Nurenberg, Hudsonville, MI (US); Kenneth Daniel Sherburn, Grand Haven, MI (US)

(73) Assignee: Shanghai Yanfeng Jinqiao Automotive Trim Systems Co. Ltd., Novi, MI (US)

( * ) Notice: Subject to any disclaimer, the term of this patent is extended or adjusted under 35 U.S.C. 154(b) by 23 days.

(21) Appl. No.: 15/199,885

(22) Filed: Jun. 30, 2016

(65) Prior Publication Data

US 2016/0311350 A1    Oct. 27, 2016

Related U.S. Application Data

(63) Continuation of application No. 14/429,122, filed as application No. PCT/US2013/060623 on Sep. 19, 2013, now Pat. No. 9,409,502.

(Continued)

(51) Int. Cl.
*B60R 13/00* (2006.01)
*B60N 2/75* (2018.01)
(Continued)

(52) U.S. Cl.
CPC ............ *B60N 2/793* (2018.02); *B60N 2/464* (2013.01); *B60N 2/4633* (2013.01);
(Continued)

(58) Field of Classification Search
CPC ............ B65H 2220/03; B65H 2511/20; B65H 2511/512; H04N 19/18; H04N 19/40;
(Continued)

(56) References Cited

U.S. PATENT DOCUMENTS 2,678,682 A * 5/1954 Thomas ............... B60N 2/4686
                                                    224/275
4,106,829 A * 8/1978 Dolle ................... B60N 2/4673
                                                    224/275
(Continued)

FOREIGN PATENT DOCUMENTS

CN         2484846 Y      4/2002
DE    102005035282 A1     2/2007
(Continued)

OTHER PUBLICATIONS

First Office Action from the State Intellectual Property Office of the People's Republic of China for CN Patent Application No. 201380048831.X dated Mar. 1, 2016 (English translation) (10 pages).

(Continued)

*Primary Examiner* — Kiran B Patel
(74) *Attorney, Agent, or Firm* — Christopher G. Darrow; Darrow Mustafa PC

(57) ABSTRACT

A console for a vehicle interior is disclosed. The console comprises an armrest assembly and a storage compartment. The armrest assembly for the console is configured to facilitate comfort for vehicle occupants. The armrest assembly is adjustable between a lowered position and a raised position. The armrest assembly is also configured to facilitate access to the storage compartment. The armrest assembly may be configured to move between an open position and a closed position. The armrest assembly may provide a tambour door configured to facilitate access of the storage compartment. The storage compartment is accessible when the armrest or tambour door is at the open position; the storage compartment is covered when the armrest or tambour door is at the closed position. The console may also provide a cover (e.g. a shroud) configured to cover the storage compartment when the armrest is between the low- (Continued)

ered position and the raised position. A mechanism may be configured to allow movement of the armrest from the lowered position to the raised position, from the raised position to a terminal position and from the terminal position to the lowered position. The terminal position comprises a released position.

11 Claims, 6 Drawing Sheets

Related U.S. Application Data

(60) Provisional application No. 61/703,886, filed on Sep. 21, 2012.

(51) Int. Cl.
  *B60N 2/46* (2006.01)
  *B60R 7/04* (2006.01)

(52) U.S. Cl.
  CPC ........... *B60N 2/4686* (2013.01); *B60N 2/767* (2018.02); *B60N 2/77* (2018.02); *B60R 7/04* (2013.01)

(58) Field of Classification Search
  CPC ............. H05K 7/1497; H05K 7/20745; H05K 7/20836; H05K 7/20736; G06F 1/20
  USPC ..................... 296/24.34, 153, 37.8
  See application file for complete search history.

(56) References Cited

U.S. PATENT DOCUMENTS

| | | | | |
|---|---|---|---|---|
| 5,076,641 A * | 12/1991 | Lindberg | B60N 2/46 | 297/188.19 |
| 5,104,184 A * | 4/1992 | Kwasnik | B60N 2/4606 | 248/311.2 |
| 5,104,185 A * | 4/1992 | Christiansen | B60N 2/4606 | 248/311.2 |
| 5,104,186 A * | 4/1992 | Kwasnik | B60N 2/4606 | 248/311.2 |
| 5,104,187 A * | 4/1992 | Fischer | B60N 2/4606 | 248/311.2 |
| 5,121,963 A * | 6/1992 | Kwasnik | B60N 2/4686 | 160/380 |
| 5,316,368 A * | 5/1994 | Arbisi | B60N 3/102 | 224/275 |
| 5,390,976 A * | 2/1995 | Doughty | B60N 2/4613 | 297/115 |
| 5,562,331 A * | 10/1996 | Spykerman | B60N 2/4686 | 297/188.16 |
| 5,636,899 A * | 6/1997 | Schiff | B60N 2/464 | 248/118 |
| 5,673,890 A * | 10/1997 | Duesterberg | B60N 2/4686 | 224/926 |
| 5,732,994 A * | 3/1998 | Stancu | B60N 2/4646 | 224/400 |
| 5,845,965 A * | 12/1998 | Heath | B60N 2/464 | 297/188.14 |
| 5,979,987 A * | 11/1999 | Rich | B60N 2/4626 | 297/188.18 |
| 6,032,587 A * | 3/2000 | Salenbauch | B60N 2/4686 | 108/44 |
| 6,033,015 A * | 3/2000 | Husted | B60N 2/4686 | 16/307 |
| 6,045,173 A * | 4/2000 | Tiesler | B60N 2/4646 | 220/813 |
| 6,059,358 A * | 5/2000 | Demick | B60N 2/206 | 297/125 |
| 6,176,385 B1 * | 1/2001 | Feese | B60N 2/4686 | 220/326 |
| 6,203,088 B1 * | 3/2001 | Fernandez | B60N 2/4646 | 296/24.34 |
| 6,220,660 B1 * | 4/2001 | Bedro | B60N 2/468 | 108/44 |
| 6,631,774 B2 * | 10/2003 | Hayashi | B62K 5/007 | 180/65.1 |
| 6,682,116 B1 * | 1/2004 | Okumura | B60N 2/4606 | 224/275 |
| 6,811,197 B1 * | 11/2004 | Grabowski | B60R 7/04 | 180/68.5 |
| 6,851,736 B1 * | 2/2005 | Klopp, III | B60R 7/04 | 224/926 |
| 6,929,304 B1 * | 8/2005 | Dry | A47C 7/72 | 224/539 |
| 8,528,956 B1 * | 9/2013 | Winiger | B60R 7/04 | 296/24.34 |
| 9,561,753 B1 * | 2/2017 | Mendoza Vera | B60R 7/04 | |
| 9,840,172 B2 * | 12/2017 | Hwang | B60N 2/4686 | |
| 2002/0089217 A1 * | 7/2002 | Scheerhorn | B60N 2/4646 | 297/188.19 |
| 2002/0163215 A1 * | 11/2002 | Emerling | B60N 2/4686 | 296/24.34 |
| 2003/0122392 A1 * | 7/2003 | Larsen | B60N 2/4686 | 296/24.34 |
| 2003/0155787 A1 * | 8/2003 | Lein | B60N 2/4686 | 296/24.34 |
| 2004/0080173 A1 * | 4/2004 | Niwa | B60N 2/4646 | 296/24.34 |
| 2004/0217615 A1 * | 11/2004 | Lindstrom | B60N 2/4686 | 296/24.34 |
| 2005/0224509 A1 * | 10/2005 | Dry | B60N 3/107 | 220/849 |
| 2006/0066118 A1 * | 3/2006 | Radu | B60R 7/04 | 296/37.8 |
| 2006/0071497 A1 * | 4/2006 | Radu | B60N 2/46 | 296/24.34 |
| 2006/0097532 A1 * | 5/2006 | Adams | B60R 7/04 | 296/24.34 |
| 2006/0108816 A1 * | 5/2006 | Radu | B60N 2/4606 | 296/24.34 |
| 2006/0208506 A1 * | 9/2006 | Kern | B60R 7/04 | 292/304 |
| 2006/0242671 A1 * | 10/2006 | Vitito | B60R 11/0211 | 725/75 |
| 2006/0258440 A1 * | 11/2006 | Vitito | A63F 13/08 | 463/29 |
| 2006/0258441 A1 * | 11/2006 | Vitito | B60R 11/02 | 463/29 |
| 2007/0069544 A1 * | 3/2007 | Sturt | B60N 2/4686 | 296/37.8 |
| 2007/0075558 A1 * | 4/2007 | Kim | B60N 2/4686 | 296/24.34 |
| 2007/0075559 A1 * | 4/2007 | Sturt | B60N 2/4646 | 296/37.8 |
| 2007/0085363 A1 * | 4/2007 | Sturt | B60R 7/04 | 296/37.8 |
| 2007/0151399 A1 * | 7/2007 | Gamache | B60T 7/102 | 74/523 |
| 2007/0176449 A1 * | 8/2007 | Kukucka | B60N 2/4646 | 296/24.34 |
| 2007/0236036 A1 * | 10/2007 | Downey | B60N 2/4686 | 296/37.1 |
| 2008/0048466 A1 * | 2/2008 | Singh | B60N 3/08 | 296/37.8 |
| 2008/0122241 A1 * | 5/2008 | Blackmore | B60N 2/4686 | 296/37.8 |
| 2008/0129071 A1 | 6/2008 | Hipshier et al. | | |
| 2009/0066103 A1 * | 3/2009 | Koarai | B60N 2/4606 | 296/24.34 |
| 2009/0072565 A1 * | 3/2009 | Mayne, Jr. | B60N 2/4686 | 296/24.34 |
| 2009/0108609 A1 * | 4/2009 | Hirai | B60R 7/04 | 296/37.16 |
| 2009/0174206 A1 * | 7/2009 | Vander Sluis | B60R 7/04 | 296/24.34 |

(56) References Cited

U.S. PATENT DOCUMENTS

| | | | | |
|---|---|---|---|---|
| 2009/0174207 A1* | 7/2009 | Lota | ............... | B60R 7/04 |
| | | | | 296/24.34 |
| 2009/0174236 A1* | 7/2009 | Lota | ............... | B60N 2/4606 |
| | | | | 297/188.19 |
| 2010/0050380 A1* | 3/2010 | Fujiwara | ............... | B60N 2/4686 |
| | | | | 16/242 |
| 2010/0090491 A1* | 4/2010 | Hipshier | ............... | B60R 7/04 |
| | | | | 296/24.34 |
| 2010/0156129 A1* | 6/2010 | Evans | ............... | B60R 7/04 |
| | | | | 296/24.34 |
| 2010/0187847 A1* | 7/2010 | Jones | ............... | B60R 13/02 |
| | | | | 296/1.08 |
| 2011/0121596 A1* | 5/2011 | Beyer | ............... | B60N 2/468 |
| | | | | 296/24.34 |
| 2011/0227359 A1* | 9/2011 | Fesenmyer | ............... | B60N 2/4606 |
| | | | | 296/24.34 |
| 2013/0038279 A1* | 2/2013 | Seyerle | ............... | B60R 16/033 |
| | | | | 320/108 |
| 2013/0038280 A1* | 2/2013 | Boundy | ............... | B60R 7/04 |
| | | | | 320/108 |
| 2013/0062899 A1* | 3/2013 | Stoia | ............... | B60N 2/4646 |
| | | | | 296/24.34 |
| 2013/0111706 A1* | 5/2013 | Anderson | ............... | B60N 2/4686 |
| | | | | 16/342 |
| 2013/0153717 A1* | 6/2013 | Cinco | ............... | B60N 2/4646 |
| | | | | 248/118 |
| 2013/0285603 A1* | 10/2013 | Zeinstra | ............... | H02J 7/0004 |
| | | | | 320/108 |
| 2013/0300144 A1* | 11/2013 | Rose | ............... | B60R 7/04 |
| | | | | 296/24.34 |
| 2014/0361567 A1* | 12/2014 | Singh | ............... | E05D 7/02 |
| | | | | 296/37.8 |
| 2015/0258923 A1* | 9/2015 | Skapof | ............... | B60N 2/4606 |
| | | | | 296/24.34 |
| 2015/0375595 A1* | 12/2015 | Fesenmyer | ............... | B60H 1/00271 |
| | | | | 296/37.14 |
| 2016/0001684 A1* | 1/2016 | An | ............... | B60N 2/4646 |
| | | | | 296/37.5 |
| 2016/0090014 A1* | 3/2016 | Dinant | ............... | B60N 2/464 |
| | | | | 297/411.36 |
| 2016/0107550 A1* | 4/2016 | Hwang | ............... | B60N 2/4686 |
| | | | | 297/161 |
| 2016/0207468 A1* | 7/2016 | Fesenmyer | ............... | B60R 7/04 |
| 2016/0336789 A1* | 11/2016 | Hyun | ............... | H02J 7/025 |
| 2016/0365745 A1* | 12/2016 | Hyun | ............... | H02J 7/025 |
| 2017/0057387 A1* | 3/2017 | Jang | ............... | B60N 2/4686 |
| 2017/0267134 A1* | 9/2017 | Anderson | ............... | B60N 2/4686 |

FOREIGN PATENT DOCUMENTS

| | | |
|---|---|---|
| DE | 102007024000 A1 | 11/2008 |
| FR | 2961763 A1 | 12/2011 |
| KR | 20060020176 A | 3/2006 |
| WO | 2008142116 A1 | 11/2008 |

OTHER PUBLICATIONS

Supplementary Search Report from the State Intellectual Property Office of the People's Republic of China for CN Patent Application No. 201380048831.X dated Apr. 28, 2017 (English translation) (1 page).
Notification of Reason for Refusal from the Korean Intellectual Property Office for KR Patent Application No. 10-2015-7009858 dated Mar. 17, 2016 (English translation) (5 pages).
International Search Report and Written Opinion for PCT Appln. No. PCT/US13/060623 dated Nov. 28, 2013.
Office action dated Mar. 17, 2016 from the Korean Intellectual Property Office (KIPO/Korea) for KR Application No. 2015-7009858.

* cited by examiner

VEHICLE INTERIOR COMPONENT

CROSS REFERENCE TO RELATED APPLICATION

The present application is a continuation of U.S. application Ser. No. 14/429,122 titled "VERTICALLY ADJUSTABLE ARMREST ASSEMBLY FOR A VEHICLE INTERIOR COMPONENT" filed Mar. 18, 2015.

The present application claims priority from and the benefit of and incorporates by reference in entirety of the following applications: (a) U.S. application Ser. No. 14/429,122 titled "VERTICALLY ADJUSTABLE ARMREST ASSEMBLY FOR A VEHICLE INTERIOR COMPONENT" filed Mar. 18, 2015; (b) International Application No. PCT/US2013/060623 titled "VERTICALLY ADJUSTABLE ARMREST ASSEMBLY FOR A VEHICLE INTERIOR COMPONENT" filed Sep. 19, 2013; (c) U.S. Provisional Patent Application No. 61/703,886 titled "VERTICALLY ADJUSTABLE ARMREST ASSEMBLY FOR A VEHICLE INTERIOR COMPONENT" filed Sep. 21, 2012.

FIELD

The present invention relates to a vehicle interior component.

BACKGROUND

It is known to provide a console for a vehicle interior. It is also known to provide an armrest on the console to facilitate conform for vehicle occupants. It is also known to provide a storage compartment within the console to store various items such as keys and/or purse, etc.

It would be advantageous to provide an improved console for a vehicle interior comprising an armrest with adjustability (e.g. between a lowered position and a raised position) to further improve comfort for vehicle occupants. It would also be advantageous to provide a cover within the console to cover the storage compartment within the console regardless of the position of the armrest.

SUMMARY

The present invention relates to a component for a vehicle interior. The component comprises a base comprising an opening, a pivot joint coupled to the base, an armrest coupled to the base configured to cover the opening of the base and rotate between a lowered position and a raised position and a mechanism coupled to the base. The mechanism may be configured to allow movement of the armrest from the lowered position to the raised position, from the raised position to a terminal position and from the terminal position to the lowered position. The mechanism may be configured to prevent movement of the armrest from the raised position to the lowered position; the mechanism may be configured to move the armrest from the terminal position to the lowered position. The mechanism may comprise a spring configured to move the armrest from the terminal position to the lowered position; the mechanism may comprise a damper configured to resist movement of the armrest from the terminal position to the lowered position. The mechanism may further comprise a shroud configured to move with the armrest from the lowered position to the raised position; the shroud may be configured to cover the opening when the armrest is in the lowered position, the raised position and the terminal position. The armrest may comprise a release mechanism configured to allow movement of the armrest relative to the shroud to uncover the opening; the armrest may comprise a tambour door configured to cover the opening and uncover the opening when the armrest is in the lowered position and the raised position; the terminal position may comprise a released position. The mechanism may comprise a follower coupled to the carrier; the follower may comprise a pin configured to engage a track within a guide. The track may comprise a plurality of notches configured to capture the pin to block movement of the armrest from the raised position to the lowered position; the track may comprise a plurality of ridges configured to direct the pin toward a corresponding notch. The base may comprise a storage compartment; the storage compartment may comprise the opening. Movement of the armrest may comprise rotation; the armrest is free to move from the lowered position to the raised position and from the raised position to the terminal position.

The present invention also relates to a console for a vehicle interior. The console comprises a base comprising a storage compartment, a cover pivotally coupled to the base, a cover coupled to the base configured to cover the storage compartment and a mechanism coupled to the base configured to allow movement of the cover from a lowered position to a raised position and from the raised position to the lowered position. The mechanism may be configured to prevent movement of the cover from the raised position to the lowered position; the mechanism may be configured to move the cover from a terminal position to the lowered position. The mechanism may comprise a spring configured to move the cover from the terminal position to the lowered position; the mechanism may comprise a damper configured to resist movement of the cover from the terminal position to the lowered position. The cover may comprise a tambour door configured to cover the storage compartment and uncover the storage compartment when the cover is in the lowered position and the raised position.

FIGURES

DESCRIPTION

Figure 1A:
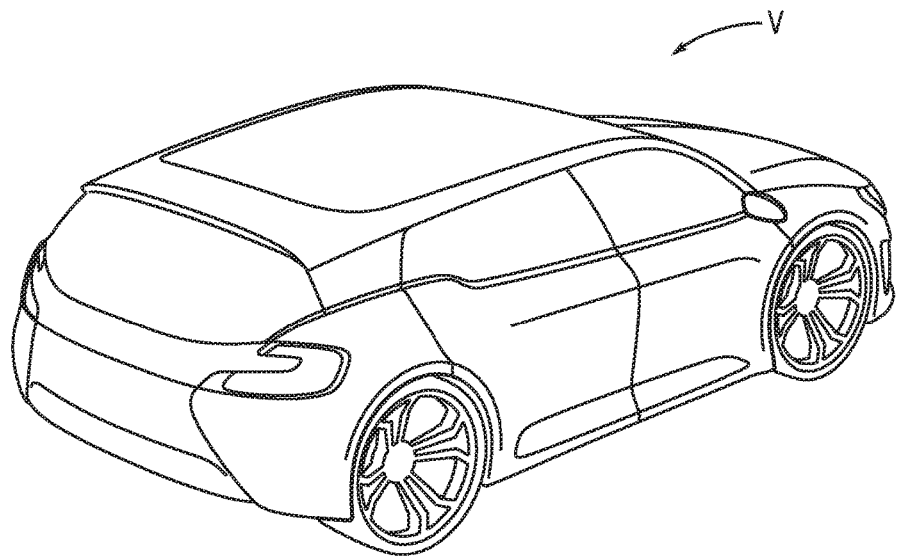
FIG. 1A is a schematic perspective view of a vehicle according to an exemplary embodiment.
Figure 1B:
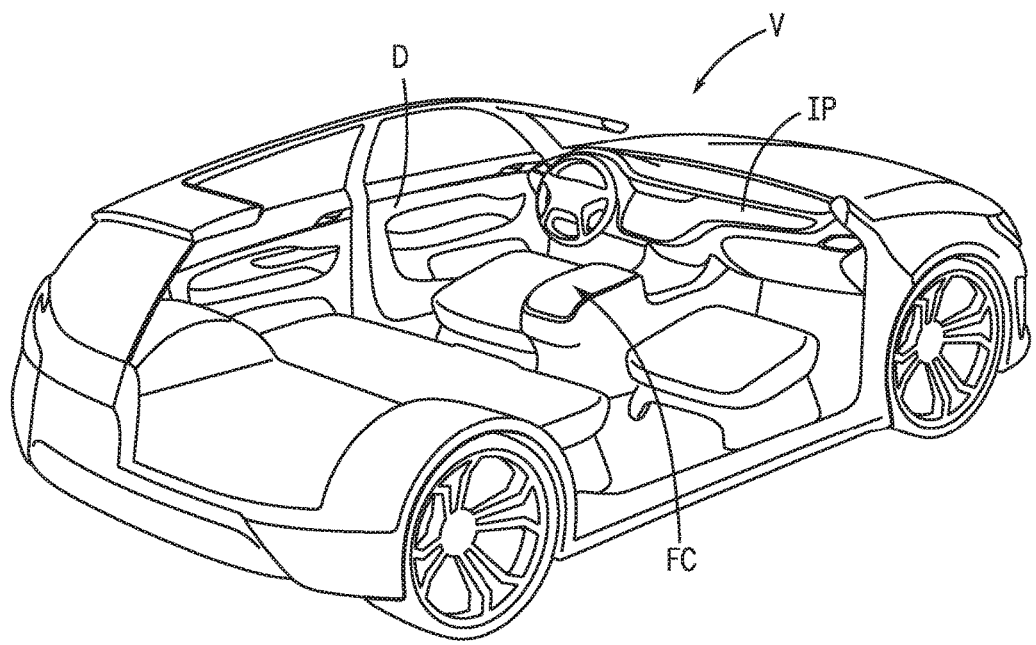
FIG. 1B is a schematic perspective cut-away view of the vehicle showing an interior according to an exemplary embodiment.

Referring to FIGS. 1A and 1B, a vehicle V is shown including an interior I with a console shown as a floor console FC and an instrument panel IP according to an exemplary embodiment; floor console FC comprises an armrest and a storage compartment within floor console FC; the armrest facilitates access to the storage compartment according to an exemplary embodiment. According to an exemplary embodiment, the armrest may also provide a tambour door to facilitate access to the storage compartment.

As shown schematically in FIGS. 2A, 2B, 3 and 4, a console shown as a floor console 16 comprises a housing or base 18 and an armrest assembly 20. Armrest assembly 20 includes an armrest 22 and a shroud 24. According to an exemplary embodiment, armrest 22 is configured to facilitate comfort for vehicle occupants by moving between a lowered position (see FIG. 2A) and a raised position (see FIG. 2B). As shown schematically in FIG. 3, base 18 includes a storage compartment 32 and a cover 30 for storage compartment 32. According to an exemplary embodiment, cover 30 is an extension from base 18 of floor console 16 configured to cover storage compartment 32; shroud 24 is an extension from armrest assembly 20 configured to cover storage compartment 32.

Figure 2A:
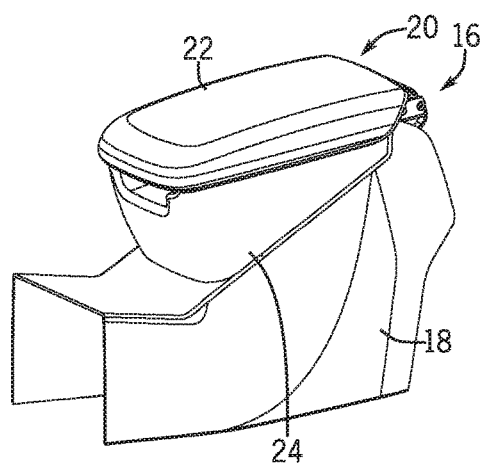
FIGS. 2A, 2B and 3 are schematic perspective views of a floor console according to an exemplary embodiment.
Figure 2B:
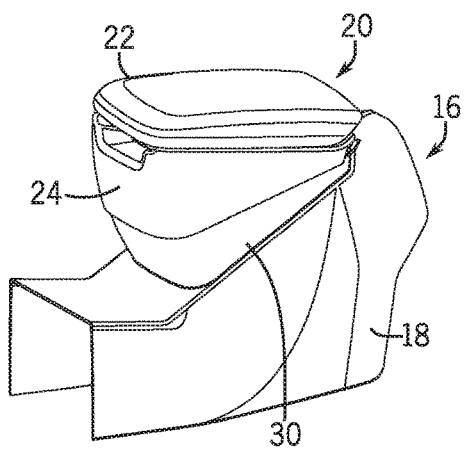
Figure 3:
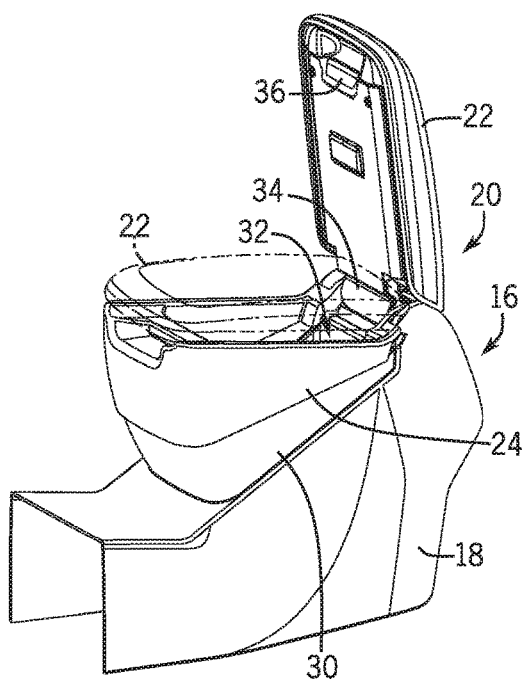
Figure 4:
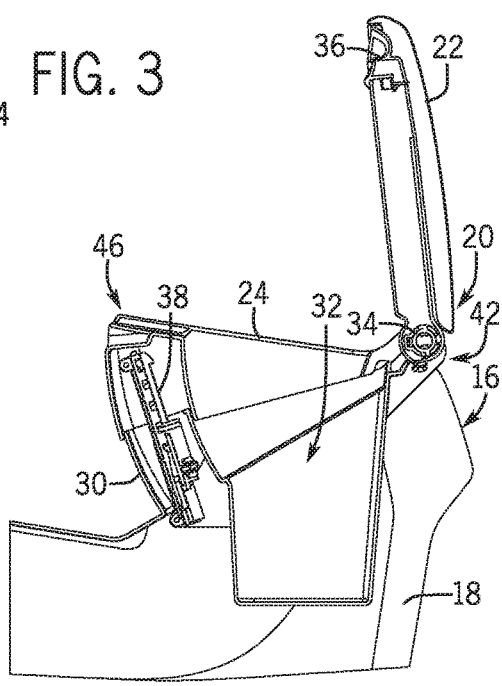
FIG. 4 is a schematic cross-sectional view of the floor console according to an exemplary embodiment.

As shown schematically in FIGS. 3 and 4, floor console 16 comprises a hinge mechanism shown as a pivot joint 34 providing a pivot (e.g. a point or axis of rotation). According to an exemplary embodiment, pivot joint 34 is configured to facilitate movement of armrest 22 between a closed position (see FIG. 2B) and an open position (see FIG. 3). According to an exemplary embodiment, pivot joint 34 is also configured to facilitate movement of shroud 24 between the lowered position (see FIG. 2A) and the raised position (see FIG. 2B). As shown schematically in FIGS. 3 and 4, armrest 22 provides a release mechanism 36. According to an exemplary embodiment, release mechanism 36 is configured to latch or unlatch armrest 22 from shroud 24 when armrest 22 is in the closed position. As shown schematically in FIG. 4, floor console 16 provides a mechanism 38 configured to facilitate movement of armrest assembly 20 between the lowered position and the raised position. As shown schematically in FIG. 4, mechanism 38 is installed on the opposite side of pivot joint 34.

As shown schematically in FIGS. 5A, 5B, 6 and 7, a floor console 16 comprises a housing or base 18 and an armrest assembly 20. Armrest assembly 20 includes an armrest 22 and a shroud 24. According to an exemplary embodiment, armrest 22 is configured to facilitate comfort for vehicle occupants by moving between a lowered position (see FIG. 5A) and a raised position (see FIG. 5B). As shown schematically in FIGS. 5A, 5B, 6 and 7, base 18 provides a recess 48 configured to partially receive and conceal shroud 24 of armrest assembly 20. As shown schematically in FIG. 7, base 18 provides storage compartment 32. According to an exemplary embodiment, shroud 24 is an extension from armrest assembly 20 configured to cover storage compartment 32.

Figures 5A, 5B:
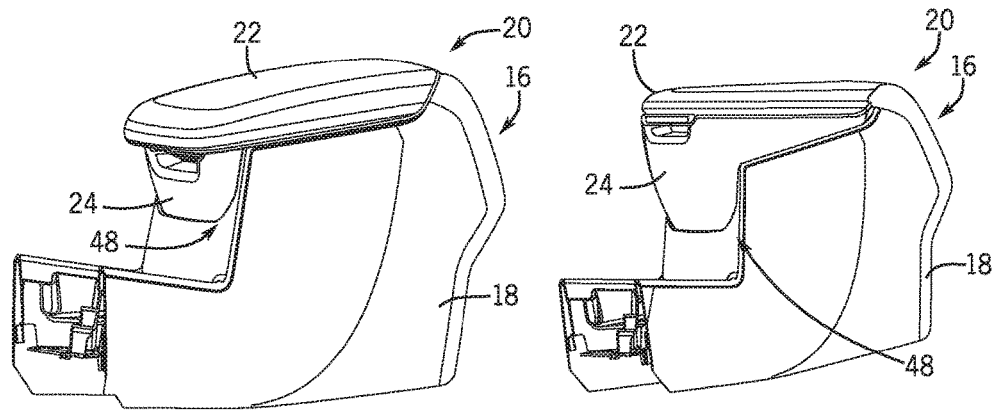
FIGS. 5A, 5B and 6 are schematic perspective views of a floor console according to an exemplary embodiment.
Figure 6:
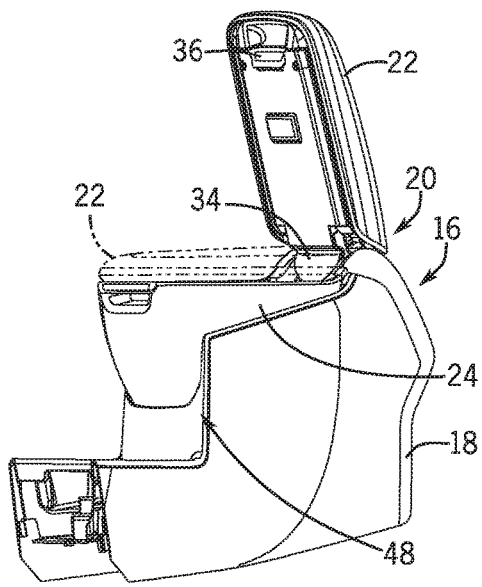
Figure 7:
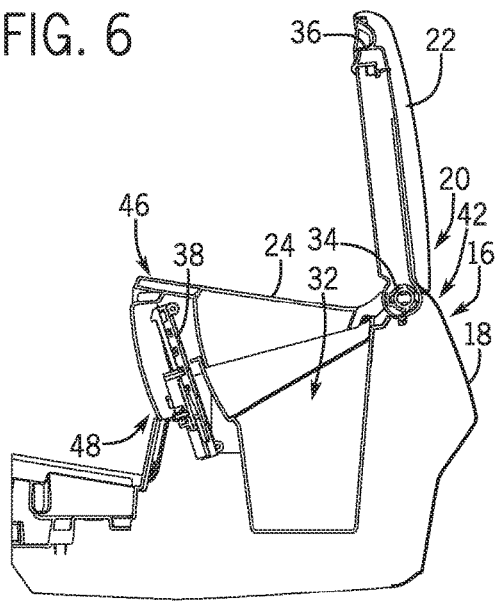
FIG. 7 is a schematic cross-sectional view of the floor console according to an exemplary embodiment.

As shown schematically in FIGS. 6 and 7, floor console 16 also comprises hinge mechanism shown as pivot joint 34 providing a pivot (e.g. a point or axis of rotation). According to an exemplary embodiment, pivot joint 34 is configured to facilitate movement of armrest 22 between a closed position (see FIG. 5B) and an open position (see FIG. 6). According to an exemplary embodiment, pivot joint 34 is also configured to facilitate movement of shroud 24 between the lowered position (see FIG. 5A) and the raised position (see FIG. 5B). As shown schematically in FIGS. 6 and 7, armrest 22 provides a mechanism shown as a release mechanism 36. According to an exemplary embodiment, release mechanism 36 is configured to latch or unlatch armrest 22 from shroud 24 when armrest 22 is in the closed position. As shown schematically in FIG. 7, floor console 16 provides a mechanism 38 configured to facilitate movement of armrest assembly 20 between a lowered position and a raised position. As shown schematically in FIG. 7, mechanism 38 is installed on the opposite side of pivot joint 34.

Figure 8:
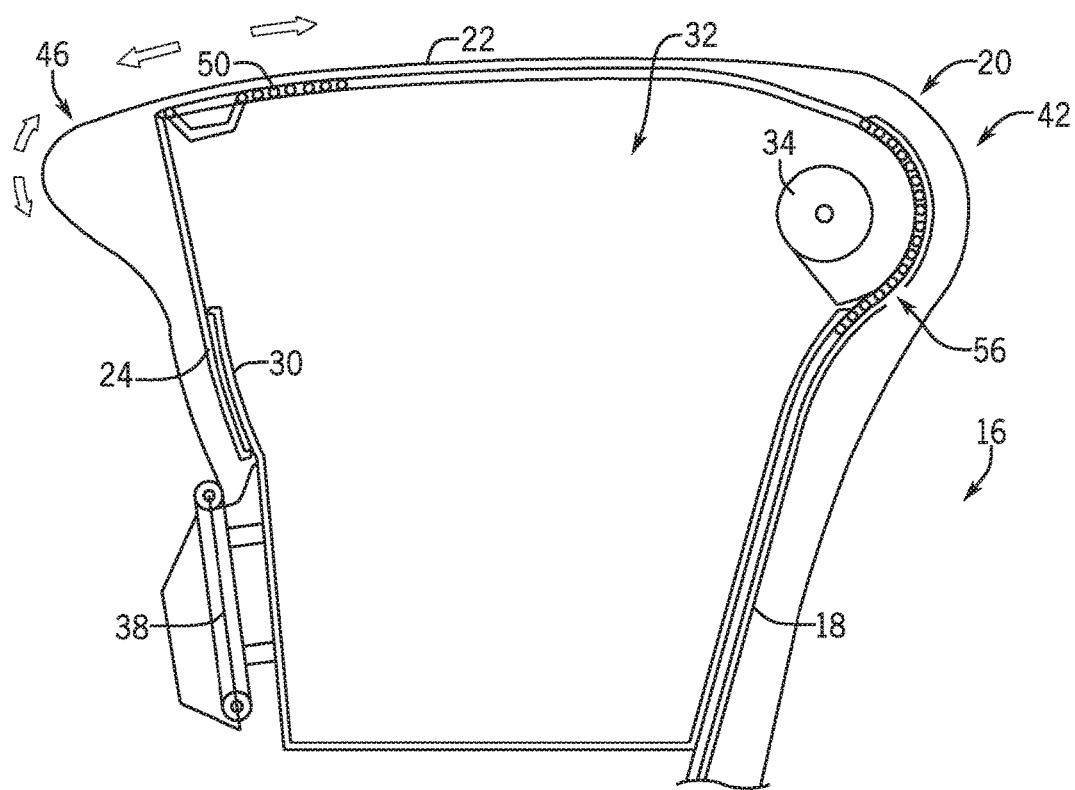
FIG. 8 is a schematic cross-sectional view of a floor console according to an exemplary embodiment.

As shown schematically in FIG. 8, floor console 16 provides base 18; storage compartment 32 is provided within base 18; floor console 16 also provides armrest assembly 20. As shown schematically in FIG. 8, armrest assembly 20 comprises armrest 22, a tambour door 50 and shroud 24. According to an exemplary embodiment, armrest 22 and shroud 24 are configured to move together between a lowered position and a raised position. Floor console 16 provides a hinge mechanism shown as pivot joint 34 configured to facilitate movement of armrest assembly 20 between the lowered position and the raised position. According to an exemplary embodiment, tambour door 50 is configured to move between an open position and a closed position; storage compartment 32 is accessible to vehicle occupants when tambour door 50 is in the open position; the opening of storage compartment 32 is covered by tambour door 50 when tambour door 50 is in the closed position.

As shown schematically in FIG. 8, base 18 provides a cover 30; cover 30 is an extension from base 18 configured to provide a cover for storage compartment 32. As shown schematically in FIG. 8, floor console 16 provides mechanism 38 configured to adjust the angle of armrest assembly 20 between the lowered position and the raised position. As shown schematically in FIG. 8, mechanism 38 is installed on the opposite side of pivot joint 34. As shown schematically in FIG. 8, floor console 16 provides a gap 56 to allow armrest to move to the raised position. According to an exemplary embodiment, tambour door 50 extends across gap 56 to substantially cover storage compartment 32.

Figure 9:
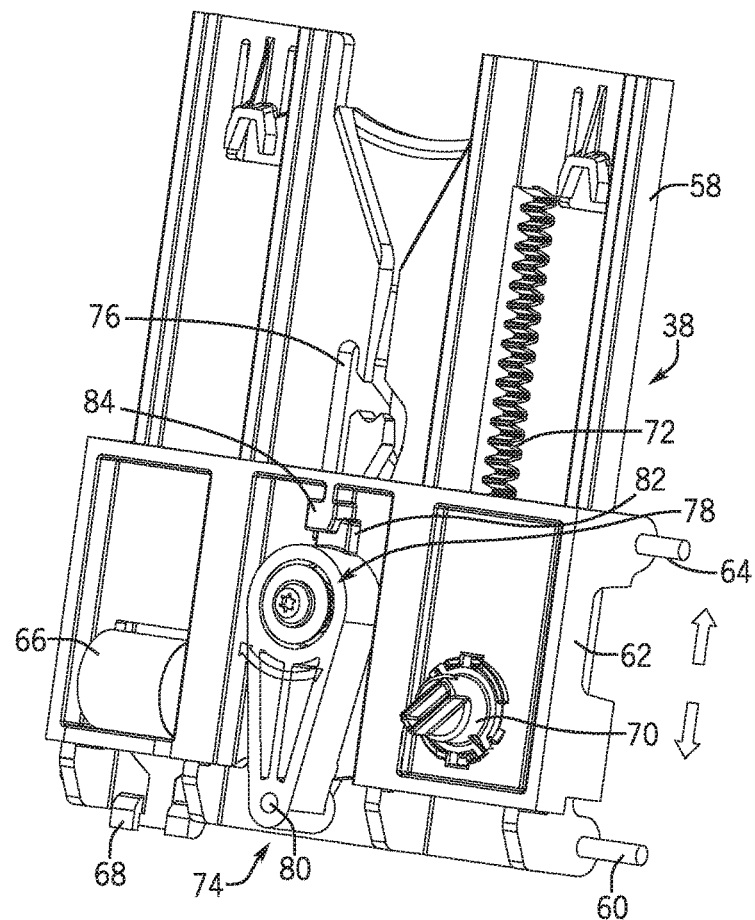
FIG. 9 is a schematic perspective view of a mechanism for adjusting the height of an armrest on the floor console according to an exemplary embodiment.
Figure 10:
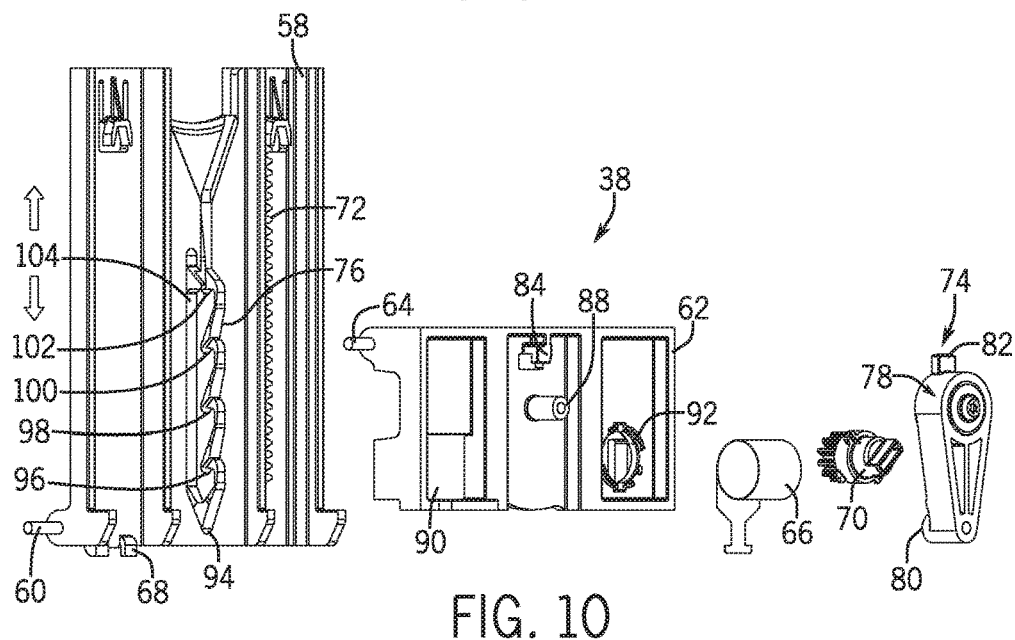
FIG. 10 is a schematic exploded view of the mechanism according to an exemplary embodiment.
Figure 11:
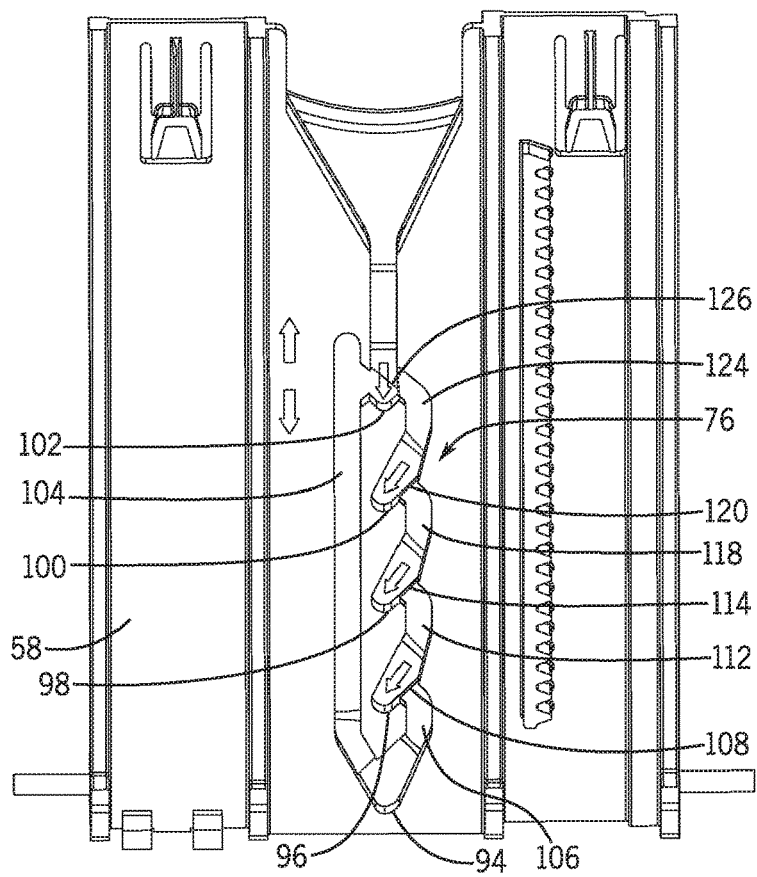
FIG. 11 is a schematic detailed front view of a track within the mechanism according to an exemplary embodiment.

As shown schematically in FIGS. 9, 10 and 11, mechanism 38 comprises a feature shown as a guide 58 and a feature shown as a carrier 62; guide 58 provides a pin 60 configured to attach mechanism 38 to base 18; carrier 62 provides a pin 64 configured to attach mechanism 38 to shroud 24 on armrest assembly 20. According to an exemplary embodiment, carrier 62 is configured to slide relative to guide 58; the sliding movement between guide 58 and carrier 62 facilitates the movement of the armrest assembly between the lowered position and the raised position.

As shown schematically in FIGS. 9 and 10, mechanism 38 comprises a spring shown as a tape spring 66, a damper shown as a rotary damper 70 on carrier 62, and a rack 72 provided on guide 58. According to an exemplary embodiment, spring 66 is biased to move carrier 62 towards the lowered position; spring 66 is intended to provide a substantially consistent pulling force; rotary damper 70 is coupled to rack 72; rotary damper 70 is intended to provide a smooth motion for carrier 62 as carrier 62 moves towards the lowered position.

Figure 12:
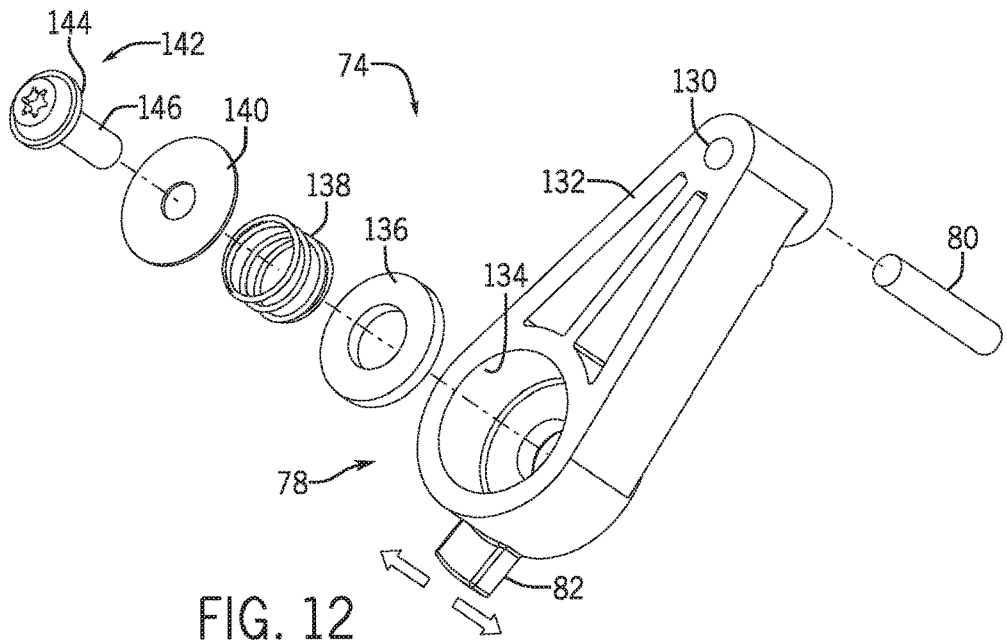
FIG. 12 is a schematic exploded view of a follower within the track according to an exemplary embodiment.

As shown schematically in FIGS. 9, 10 and 12, mechanism 38 also comprises a mechanism shown as a follower 74; guide 58 provides a track system 76 configured to provide stops for carrier 62 between the lowered position and the raised position. As shown schematically in FIGS. 9, 10 and 12, mechanism 74 provides a pin 80 configured to travel within track system 76. As shown schematically in FIGS. 9, 10, and 11, track system 76 provides notches operating as detent mechanisms (i.e. notch 94, notch 96, notch 98, notch 100, notch 102) and a portion 104. As shown schematically in FIGS. 9 and 11, track system 76 also provides ramp 106, ramp 112, ramp 118, ramp 124, ridge 108, ridge 114, ridge 120 and ridge 126 that connects to the corresponding notch 94, notch 96, notch 98, notch 100 and notch 102. According to an exemplary embodiment, pin 80 is spring loaded to engage with each notch provided by track system 76; each notch within track system 76 corresponds to a position for the armrest assembly between the lowered position and the raised position; notch 94 corresponds to the lowered position and notch 102 corresponds to the raised position. According to an exemplary embodiment, when the armrest assembly is fully raised to a terminal position (i.e. when pin 80 is lifted out of engagement with notch 102 and enters the top of portion 104) pin 80 engages with portion 104 of track system 76; pin 80 is configured to travel downwards within portion 104 guiding carrier 62 to return to the lowered position as pin 80 slides toward notch 94 from portion 104 of track system 76.

As shown schematically in FIG. 12, mechanism 74 comprises a housing or body 132; housing 132 provides a first opening 130 and a second opening 134; pin 80 is attached to first opening 130 of housing 132; housing 132 also provides a protrusion 84. As shown schematically in FIG. 12, mechanism 74 provides a spring 138; spring 138 is attached to second opening 134 on housing 132 by a fastener 142 with washer/spacer 136 and washer/spacer 140 on the opposing sides of spring 138.

Exemplary Embodiments

As shown schematically in FIGS. 1A and 1B, a vehicle V includes an interior I having an instrument panel IP and a floor console FC. According to an exemplary embodiment, floor console FC may include an adjustable armrest configured to facilitate driver and/or passenger comfort by raising and/or lowering. According to an exemplary embodiment, an armrest assembly includes a pivot joint positioned at a first longitudinal end of the armrest assembly. The pivot joint is configured to couple the armrest assembly to a housing of the floor console FC. The armrest assembly also includes an armrest configured to rotate about the pivot joint between a lowered position and a raised position. Floor console FC includes a storage compartment configured to retain various items, such as portable electronic devices, documentation, and/or glasses, among other items. According to an exemplary embodiment, the armrest assembly includes a shroud positioned below the armrest and configured to rotate with the armrest about the pivot joint. The armrest and the shroud are configured to substantially cover an opening in the storage compartment while the armrest is in the lowered position, the raised position, or a position between. Items within the storage compartment are retained regardless of armrest position.

The armrest assembly includes an adjustment mechanism positioned at a second longitudinal end of the armrest assembly opposite the first longitudinal end. The pivot joint may be positioned at a rear portion of the armrest assembly and the adjustment mechanism may be positioned at a front portion of the armrest assembly. The adjustment mechanism is configured to hold the armrest in one of a number of vertical positions including the lowered position and the raised position. The adjustment mechanism is positioned at the opposite longitudinal end of the armrest assembly from the pivot joint; the adjustment mechanism may be subjected to less loading (e.g. torque) than an adjustment mechanism integrated within or coupled to the pivot joint. The adjustment mechanism may be constructed from lighter and/or less expensive materials, thereby reducing vehicle weight and/or manufacturing costs.

The vertically adjustable armrest assembly may be employed within other vehicle interior components (e.g. a seat, a door panel, and/or a rear seat assembly) and may include a vertically adjustable armrest configured to be raised and/or lowered to a position that facilitates driver and/or passenger comfort. The armrest assembly may include a shroud configured to substantially cover an opening in the storage compartment while the armrest is in the lowered position, the raised position, or a position between. The armrest assembly may also include an adjustment mechanism positioned at the opposite longitudinal end of the armrest assembly from the pivot joint to facilitate reduced structural loading on the adjustment mechanism.

As shown schematically in FIG. 2A, floor console 16 includes a housing 18 configured to support an armrest assembly 20. Housing 18 may include a storage compartment configured to retain various items (such as documents, glasses, and/or portable electronic devices, among other items). Armrest assembly 20 includes an armrest 22 configured to rotate between the lowered position and a raised position; armrest assembly 20 also includes a shroud 24 positioned below armrest 22 and configured to rotate with the armrest 22; shroud 24 and armrest 22 are configured to substantially cover an opening in the storage compartment while the armrest is in the lowered position, the raised position or a position between. Items within the storage compartment are retained regardless of armrest position.

Shroud 24 is disposed about a vertical extension of housing 18. With armrest 22 in the lowered position shroud 24 substantially covers the vertical extension. When the armrest is rotated in an upward direction, a portion of the vertical extension is exposed. Contact between shroud 24 and the vertical extension blocks items from being released from the storage compartment. Items within the storage compartment are retained regardless of armrest position; armrest 22 may also be rotated in a downward direction to the lowered position. An adjustment mechanism may be employed to control movement of the armrest relative to the floor console 16 and to hold the armrest in one of a variety of vertical positions.

As shown schematically in FIG. 3, armrest 22 is in the raised position; a portion of a vertical extension 30 of housing 18 is exposed. Contact between shroud 24 and vertical extension 30 blocks items from being released from a storage compartment 32 while the armrest is in the raised position. Items within storage compartment 32 are retained regardless of armrest position.

An armrest assembly 20 includes a pivot joint 34 positioned at a rearward longitudinal end of armrest assembly 20; pivot joint 34 is configured to couple armrest assembly 20 to housing 18 of the floor console 16; armrest 22 is configured to rotate about pivot joint 34 between the lowered position and the raised position. Shroud 24 is configured to rotate with armrest 22 about pivot joint 34; shroud 24 and armrest 22 are configured to substantially cover an opening in storage compartment 32 while armrest 22 is in the lowered position (see FIG. 2A), the raised position (see FIG. 2B) or a position between the lowered position and the raised position.

Armrest 22 is configured to rotate about pivot joint 34 relative to shroud 24 to facilitate access to storage compartment 32. While armrest 22 is in the closed position armrest 22 and shroud 24 substantially cover the opening in storage compartment 32, blocking access to items within the storage compartment. A vehicle occupant may rotate armrest 22 to an open position, enabling the occupant to access items within storage compartment 32. According to an exemplary embodiment, armrest assembly 20 includes a release mechanism 36 configured to selectively block rotation of armrest 22 relative to shroud 24; armrest 22 may be held in the closed position during vehicle operation. By engaging release mechanism 36, an occupant may rotate armrest 22 to the open position, facilitating access to storage compartment 32; armrest 22 may be rotated between the open position and the closed position independently of the vertical height adjustment. A vehicle occupant may access the storage compartment while the armrest is in the raised position, the lowered position or a position between.

As shown schematically in FIG. 4, armrest assembly 20 includes an adjustment mechanism 38 configured to hold the armrest in one of a variety of vertical positions including the lowered position and the raised position. A height of armrest 22 may be adjusted in a vertical direction to facilitate passenger comfort (e.g. to accommodate passengers of different heights and/or builds). Pivot joint 34 is positioned at a first (e.g. rear) end 42 of armrest assembly 20 along a longitudinal direction; adjustment mechanism 38 is positioned at a second (e.g. front) end 46 of armrest assembly 20, opposite the first end, along the longitudinal direction. Because adjustment mechanism 38 is positioned at the opposite longitudinal end of armrest assembly 20 from pivot joint 34, adjustment mechanism 38 may be subjected to less loading (e.g. torque) than an adjustment mechanism integrated within or coupled to the pivot joint. The adjustment mechanism may be constructed from lighter and/or less expensive materials (e.g. plastic) reducing vehicle weight and/or manufacturing costs.

Shroud 24 is disposed about vertical extension 30 of housing 18. Contact between shroud 24 and vertical extension 30 blocks items from being released from storage compartment 32. Items within storage compartment 32 are retained regardless of armrest position; adjustment mechanism 38 is positioned within a cavity between an exterior surface of the floor console 16 and an interior surface of storage compartment 32; adjustment mechanism 38 is hidden from the vehicle occupants, enhancing the appearance of the vehicle interior.

As shown schematically in FIG. 5A, shroud 24 is disposed within a recess 48 in housing 18. With armrest 22 in the lowered position, housing 18 substantially covers shroud 24. When armrest 22 is rotated in an upward direction an additional portion of shroud 24 is exposed. Shroud 24 and armrest 22 are configured to substantially cover an opening in the storage compartment while the armrest is in the lowered position, the raised position or a position between. Items within the storage compartment are retained regardless of armrest position.

As shown schematically in FIG. 6, when armrest 22 is in the raised position, a larger portion of shroud 24 is exposed. Contact between shroud 24 and housing 18 blocks items from being released from storage compartment 32 while the armrest is in the raised position. Items within storage compartment 32 are retained regardless of armrest position.

According to an exemplary embodiment, pivot joint 34 is configured to couple armrest assembly 20 to housing 18 of the floor console 16. The armrest 22 is configured to rotate about pivot joint 34 between the lowered position and the raised position; shroud 24 is configured to rotate with armrest 22 about pivot joint 34. Shroud 24 and armrest 22 are configured to substantially cover an opening in storage compartment 32 while armrest 22 is in the lowered position (see FIG. 5A), the raised position (see FIG. 5B) or a position between the lowered position and the raised position.

As shown schematically in FIG. 7, armrest assembly 20 includes adjustment mechanism 38 configured to hold the armrest in one of a variety of vertical positions including the lowered position and the raised position. Height of armrest 22 may be adjusted in the vertical direction 40 to facilitate passenger comfort (e.g. to accommodate passengers of different heights and/or builds). Shroud 24 is disposed within recess 48 of housing 18. Contact between shroud 24 and housing 18 blocks items from being released from storage compartment 32. Items within storage compartment 32 are retained regardless of armrest position. Adjustment mechanism 38 is positioned within a cavity between an exterior surface of the floor console 16 and an interior surface of storage compartment 32; adjustment mechanism 38 is hidden from the vehicle occupants enhancing the appearance of the vehicle interior.

As shown schematically in FIG. 8, armrest 22 provides a tambour door 50; tambour door 50 is configured to slide from the closed position to an open position. The closed position substantially blocks the opening to the storage compartment, and the open position facilitates access to storage compartment 32. A vehicle occupant may slide tambour door 50 towards the open position access items within storage compartment 32 and then slide tambour door 50 to close the storage compartment.

According to an exemplary embodiment, armrest 22 is configured to rotate between a lowered position and a raised position. Shroud 24 is positioned below armrest 22 and configured to rotate with the armrest; shroud 24 and armrest 22 are configured to substantially cover the opening in the storage compartment while the armrest is in the lowered position, the raised position or a position between and the tambour door is closed. Access to storage compartment 32 is provided by tambour door 50. A gap 56 is formed between armrest 22 and housing 18 to facilitate rotation of armrest 22 relative to housing 18; tambour door 50 extends across gap 56 substantially enclosing the storage compartment regardless of armrest position.

An armrest may be configured to rotate relative to the shroud; the armrest assembly may include other armrest configurations. Certain armrest assemblies may include an armrest configured to slide in the longitudinal direction (e.g. front and back) relative to the shroud; the armrest may be positioned at a desired vertical position and a desired longitudinal position enhancing passenger comfort. The sliding armrest may rotate relative to the shroud to facilitate access to the storage compartment; with the sliding armrest in the closed position access to the storage compartment may be blocked throughout the longitudinal and vertical ranges of motion of the armrest.

As shown schematically in FIG. 9, adjustment mechanism is configured to hold an armrest at a desired position; adjustment mechanism 38 includes a guide 58 coupled to housing 18 (shown in FIGS. 4 and 7) by a first pin 60, and a carrier 62 coupled to armrest 22 by a second pin 64; carrier 62 is configured to translate along guide 58 to transition the armrest between a variety of vertical positions; carrier 62 may be coupled to housing 18 and guide 58 may be coupled to the armrest 22.

As shown schematically in FIG. 9, adjustment mechanism 38 includes a biasing member (e.g. a tape spring 66) extending between carrier 62 and a mount 68 on guide 58; tape spring 66 is configured to urge armrest 22 toward the lowered position resisting upward movement of the armrest during operation of the vehicle; adjustment mechanism 38 includes a damping member 70 extending between carrier 62 and guide 58; damping member 70 is configured to damp movement of armrest 22 relative to housing 18; damping member 70 includes a gear configured to engage a rack 72 of guide 58; damping member 70 is configured to resist rotation of the gear damping movement of carrier 62 along guide 58.

Adjustment mechanism 38 includes a follower 74 coupled to carrier 62 and a track 76 within guide 58. A biasing assembly 78 is configured to urge a pin 80 of follower 74 into track 76 enabling pin 80 to follow the contours of track 76; follower 74 includes a protrusion 82 configured to engage an extension 84 of carrier 62. Contact between protrusion 82 and extension 84 blocks rotation of the upper end of follower 74 away from guide 58, substantially reducing or eliminating the possibility of pin 80 disengaging track 76; protrusion 82 and extension 84 facilitate rotation (e.g. to pivot) of follower 74 enabling pin 80 to follow the contours of the track; track 76 includes multiple notches configured to capture pin 80 blocking downward movement of armrest 22 relative to the housing 22.

As shown schematically in FIG. 10, carrier 62 includes a cylindrical mount 88 for coupling follower 74 to carrier 62. A fastener within biasing assembly 78 is configured to engage an opening in the cylindrical mount (e.g. via a threaded connection) to secure follower 74 to carrier 62; carrier 62 also includes a first opening 90 configured to accommodate tape spring 66 and a second opening 92 configured to accommodate damping member 70.

As shown schematically in FIG. 10, track 76 includes multiple notches configured to capture pin 80 blocking downward movement of the armrest relative to the housing; track 76 includes a first notch 94 corresponding to the lowered position of the armrest. To increase a height of the armrest, an occupant lifts the armrest in the upward direction until a desired armrest position is achieved. The occupant then releases the armrest and a combination of the weight of the armrest and the force of tape spring 66 drives the armrest in the downward direction until pin 80 engages the first notch below the release point. If the occupant releases the armrest while the pin is between first notch 94 and a second notch 96, the armrest moves downwardly until pin 80 engages first notch 94; if the occupant releases the armrest while the pin is between second notch 96 and a third notch 98, the armrest moves downwardly until pin 80 engages second notch 96. Pin 80 may engage third notch 98, a fourth notch 100, or a fifth notch 102 (e.g. corresponding to the raised position of the armrest) in a similar manner. To lower the armrest, the occupant lifts the armrest above fifth notch 102 (such that pin 80 engages a straight portion 104 of track 76). Upon release of the armrest, the combination of the armrest weight and the force of tape spring 66 urge the armrest back to first notch 94. As the armrest moves in the downward direction, damping member 70 limits the speed of the armrest reducing the contact force between pin 80 and first notch 94, and providing smooth armrest movement.

As shown schematically in FIG. 11, track 76 includes multiple ramps and ridges configured to control movement of the pin within the track; track 76 includes a first ramp 106 positioned above first notch 94. As the armrest is lifted in the upward direction, first ramp 106 drives pin 80 outwardly (e.g. away from guide 58) against the bias of biasing assembly 78. At the end of ramp 106, which corresponds to a first ridge 108, pin 80 moves inwardly (e.g. toward guide 58). Contact between pin 80 and ridge 108 blocks movement of the pin 80 toward first notch 94; ridge 108 directs pin 80 toward second notch 96. With the armrest released while the pin is between second notch 96 and third notch 98, the combination of the armrest weight and the force of tape spring 66 drives pin 80 into second notch 96. The weight of the armrest and the force applied by tape spring 66 also urge pin 80 into notch 96 during operation of the vehicle, substantially reducing undesired movement of the armrest.

To raise armrest 22 to the next higher vertical position, the occupant lifts the armrest in the upward direction. A second ramp 112 drives pin 80 outwardly (e.g. away from guide 58) against the bias of biasing assembly 78. At the end of ramp 112, which corresponds to a second ridge 114, pin 80 moves inwardly (e.g. toward guide 58). Contact between pin 80 and ridge 114 blocks movement of pin 80 toward second notch 96; ridge 114 directs pin 80 toward third notch 98. If the armrest is released between third notch 98 and fourth notch 100, the combination of the armrest weight and the force of tape spring 66 drives pin 80 into third notch 98. Track 76 also includes a third ramp 118 extending to a third ridge 120, which is configured to direct pin 80 toward fourth notch 100; track 76 includes a fourth ramp 124 extending to a fourth ridge 126, which is configured to direct the pin 80 toward fifth notch 102.

Forth ridge 126 is also configured to direct the pin 80 toward straight portion 104 of track 76 upon upward movement of armrest 22 beyond fifth notch 102. To transition the armrest to the lowered position, the occupant lifts the armrest to the maximum vertical position, and then releases the armrest. The weight of the armrest and the force applied by tape spring 66 drive the pin in the downward direction to first notch 94, returning the armrest to the lowered position. While the embodiment includes five notches (which correspond to five vertical armrest positions) alternative embodiments may include more or fewer notches/vertical armrest positions (providing a corresponding number of vertical armrest positions).

As shown schematically in FIG. 12, follower 74 includes a first opening 130 within a body 132 of follower 74; first opening 130 is configured to secure pin 80 to body 132 (e.g. via a press-fit connection, an adhesive connection, etc.). Follower 74 also includes a second opening 134 within body 132; second opening 134 is configured to house biasing assembly 78; biasing assembly 78 includes a first washer 136 (e.g. formed from a resilient material, such as plastic), a compression spring 138, a second washer (e.g. formed from a rigid material, such as steel), and a fastener 142; fastener 142 includes a head 144 and a shaft 146; shaft 146 may be threaded to establish a threaded connection with cylindrical mount 88 of carrier 62.

Biasing assembly 78 is configured to urge pin 80 against track 76, enabling pin 80 to follow the contours of the ramps and ridges. As the pin moves along a ramp, pin 80 is driven to compress spring 138. At the end of the ramp, compressed spring 138 drives pin 80 in the opposite direction to facilitate contact between the pin and a corresponding ridge and/or notch. The possibility of the pin disengaging the track is substantially reduced or eliminated.

It is important to note that the construction and arrangement of the elements of the inventive concepts and inventions as described in this application and as shown in the figures above is illustrative only. Although some embodiments of the present inventions have been described in detail in this disclosure, those skilled in the art who review this disclosure will readily appreciate that many modifications are possible without materially departing from the novel teachings and advantages of the subject matter recited. Accordingly, all such modifications are intended to be included within the scope of the present inventions. Other substitutions, modifications, changes and omissions may be made in the design, operating conditions and arrangement of the preferred and other exemplary embodiments without departing from the spirit of the present inventions.

It is important to note that the apparatus of the present inventions can comprise conventional technology (e.g. as implemented in present configuration) or any other applicable technology (present or future) that has the capability to perform the functions and processes/operations indicated in the FIGURES. All such technology is considered to be within the scope of the present inventions and application.

The invention claimed is:

1. A component for a vehicle interior comprising:
   (a) a base comprising an opening;
   (b) a pivot joint coupled to the base;
   (c) an armrest coupled to the base configured to cover the opening of the base and rotate between a lowered position and a raised position; and
   (d) a mechanism coupled to the base;
   wherein the mechanism is configured to allow movement of the armrest (a) from the lowered position to the raised position; (b) from the raised position to a terminal position; (c) from the terminal position to the lowered position;
   wherein the mechanism is configured to hold the armrest in rotation at a plurality of positions comprising at least the lowered position and the raised position.

2. The component of claim 1 wherein the mechanism is configured to prevent movement of the armrest from the raised position to the lowered position.

3. The component of claim 1 wherein the mechanism is configured to move the armrest from the terminal position to the lowered position.

4. The component of claim 3 wherein the mechanism comprises a spring configured to move the armrest from the terminal position to the lowered position.

5. The component of claim 3 wherein the mechanism comprises a damper configured to resist movement of the armrest from the terminal position to the lowered position.

6. The component of claim 1 further comprising a shroud configured to move with the armrest from the lowered position to the raised position.

7. The component of claim 1 wherein the shroud is configured to cover the opening when the armrest is in the lowered position, the raised position and the terminal position.

8. The component of claim 1 wherein the armrest comprises a release mechanism configured to allow movement of the armrest relative to the shroud to uncover the opening.

9. The component of claim 1 wherein the terminal position comprises a released position.

10. The component of claim 1 wherein the base comprises a storage compartment; and wherein the storage compartment comprises the opening.

11. The component of claim 1 wherein movement of the armrest comprises rotation and wherein the armrest is free to move (a) from the lowered position to the raised position; (b) from the raised position to the terminal position.

* * * * *